W. L. PAUL.
ENGINE GANG PLOW.
APPLICATION FILED DEC. 19, 1916.
1,315,150.  Patented Sept. 2, 1919.
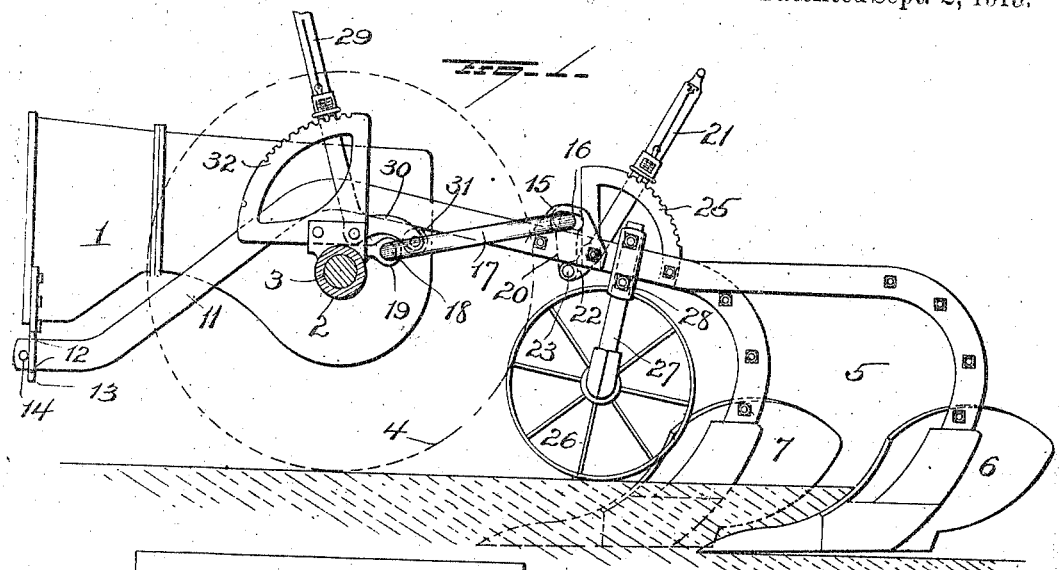
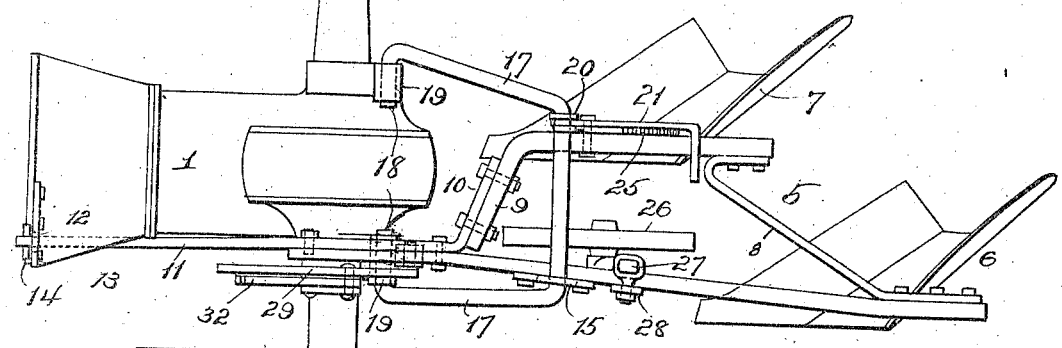
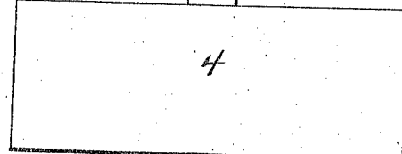
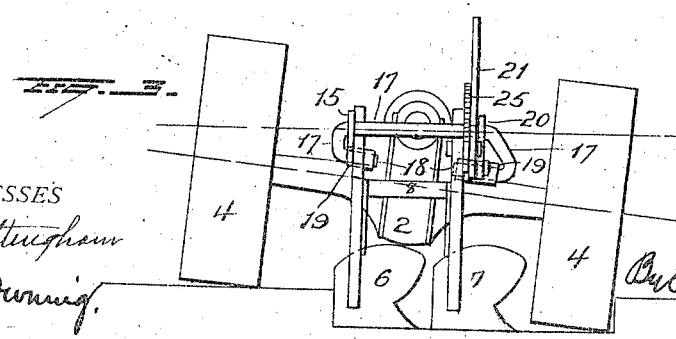
WITNESSES
INVENTOR
W. L. Paul
By Seymour Bright
Attorneys

UNITED STATES PATENT OFFICE.

WILLIAM L. PAUL, OF SAN FRANCISCO, CALIFORNIA, ASSIGNOR TO OLIVER CHILLED PLOW WORKS, OF SOUTH BEND, INDIANA.

ENGINE GANG-PLOW.

1,315,150.             Specification of Letters Patent.      Patented Sept. 2, 1919.

Application filed December 19, 1916.    Serial No. 137,321.

*To all whom it may concern:*

Be it known that I, WILLIAM L. PAUL, a citizen of the United States, and a resident of San Francisco, in the county of San Francisco and State of California, have invented certain new and useful Improvements in Engine Gang-Plows; and I do hereby declare the following to be a full, clear, and exact description of the invention, such as will enable others skilled in the art to which it appertains to make and use the same.

This invention relates to improvements in plows, and more particularly to such as employ a tractor as the draft means and known in the art as "engine gang plows."

The object of my present invention is to so construct an engine plow structure, that the plow gang shall trail behind and in comparatively close proximity to the tractor but so that the draft of the plow gang shall be from a point on the tractor an appreciable distance in advance of the rear axle, and to provide means in such a structure to steady the plow gang and at the same time cause it to have the characteristics of a "floating" gang while in operation.

With this and other objects in view, the invention consists in certain novel features of construction and combinations of parts as hereinafter set forth and pointed out in the claims.

In the accompanying drawings: Figure 1 is a side elevation of an engine gang plow structure embodying my improvements; Fig. 2 is a plan view, and Fig. 3 is a partial rear diagrammatic view.

1 represents a tractor (the forward end portion and front wheels of which are omitted) and 2 the mounting for the rear axle 3 with which the rear tractor wheels 4 are connected.

In the present instance I have shown a plow gang frame 5 comprising two plow units 6, 7 (although a greater number of plow units may be employed, if desired), and the rear ends of these plow units may be rigidly connected by means of a brace 8. The beam of the plow unit 6 may extend forwardly over the rear axle of the tractor, while the beam of the plow unit 7 may be provided at its forward end with a lateral arm 9 projecting toward the beam of plow unit 6, and to said lateral beam arm, an arm 10 at the rear end of a beam-extension 11 is securely bolted. The beam 11 is also bolted to the beam of the plow unit 6 and extends downwardly and forwardly from the same. The beam 11 thus constitutes a beam extension for the gang and its forward end is made to project loosely through an opening 12 in a bracket 13 near the forward portion of the tractor and near one side thereof,—thus effecting a guiding and supporting connection for the plow gang to the tractor at a point well in advance of the rear axle of said tractor.

While the forward end of the beam extension 11 passes freely through the opening 12 of bracket 13, still it is connected with said bracket in such manner that the draft of the plow gang will come upon said bracket, being transmitted through the long beam extension 11. This may be accomplished by means of a pin or bolt 14 passing transversely through the beam extension forwardly of the bracket 13 so that it may bear against the latter. The draft of the plow gang is thus connected with the tractor well in advance of the rear axle of the latter, and at the same time, said plow gang will be permitted to have pivotal connection with the forward portion of the tractor and the plow gang will be permitted to have a "floating" characteristic.

A bracket 15 is secured to and projects upwardly from the beam of the plow unit 6 and is provided with a horizontal slot 16 for the accommodation of the cross member of a bail 17 at a point near one end of said cross member,—the side members of said bail being provided with pintles 18 pivotally mounted in bosses 19 on the rear axle mounting of the tractor. Near the opposite end of the cross member of the bail 17 and near the beam of the plow unit 7, a link 20 is loosely connected with the cross bar of the bail and depends therefrom. A hand lever 21 is pivoted to the beam of plow unit 7 and is provided with a depending arm 22 pivotally connected at 23 with the lower end of the link 20, said lever 21 having a detent to engage a toothed segment 25 secured to the beam of the plow unit 7.

It is important that the plow gang shall be level with the land when the wheels at one side of the tractor are running in the furrow, and for this reason, the bail 17 is so formed that one end of its cross bar shall be higher than the other end, as shown in Fig. 3, thus causing the cross bar to assume a position at an angle to the plane of the rear axle of the tractor.

It is desirable however, to be able to accurately level the plow units so that they shall run at uniform depths under all conditions, as when the plowing is first begun or when the plows are adjusted to change the depth of plowing. This can be readily accomplished by manipulation of the lever 21, as will be readily understood.

In order that the conformity of the bases of the plow units to the contour of the ground shall be accurate and uniform depth of plowing be thus insured, I provide a gage wheel 26 located approximately between the points of the two plow bases. The standard 27 of this gage wheel will be adjustably connected with the beam of the plow unit 6, by means of a suitable clamp, such for instance, as illustrated at 28.

To provide means for raising the plow, 1 may employ a manually operable lever. In the present instance, a hand lever 29 is pivotally mounted on the rear axle mounting 2 of the tractor and provided with a rearwardly projecting arm 30 having a roller 31 mounted at its rear end, said roller being disposed to engage the underside of the beam of the connected plow units only when operated to raise the gang, the lever being so adjusted during the normal operation of the plow as not to interfere with the "floating" characteristic of the gang. A toothed segment 32 is secured to the axle mounting 2 and the lever 29 is provided with a suitable detent to engage said segment.

Having fully described my invention, what I claim as new and desire to secure by Letters-Patent, is:—

1. The combination with a wheeled draft frame, of a plow frame having a forward beam extension pivotally and otherwise freely jointed to the wheeled draft frame forwardly of the rear end of the latter and constituting a draft connection for the plow frame to the wheeled frame, of a steadying member pivotally connected with the rear portion of the wheeled draft frame and movably connected with the plow frame, the movable connection of the steadying member with the plow frame being such as not to interfere with the draft connection of the plow frame with the wheeled frame.

2. The combination with a wheeled draft frame, of a plow frame having a forward beam extension pivotally and otherwise freely jointed to the wheeled draft frame forwardly of the rear end of the latter and constituting a draft connection for the plow frame to the wheeled frame, of a steadying member pivotally connected with the rear portion of the wheeled draft frame and movably connected with the plow frame, the movable connection of the steadying member with the plow frame being such as not to interfere with the draft connection of the plow frame with the wheeled frame, and a device coöperable with the steadying member and the plow frame for effecting transverse angular adjustment of the latter.

3. The combination with a wheeled draft frame and a plow frame having a forward beam extension, of a steadying bail having its side members pivotally connected with the rear portion of the wheeled frame, means connecting the cross member of the bail with the plow frame whereby said parts are capable of relative fore and aft movement and means pivotally and otherwise freely connecting the beam extension with the wheeled frame, whereby a draft connection is effected for the plow frame with the wheeled frame.

4. The combination with a wheeled draft frame, of a plow frame including a plurality of beam members, means effecting a pivotal and otherwise movable connection between said plow frame and said wheeled draft frame, a steadying bail pivoted to the rear portion of the wheeled frame, a member secured to one of said beam members and having an elongated slot through which the cross member of the steadying bail passes, and a pivoted link connection between the cross member of the bail and another of said beam members.

5. The combination with a wheeled draft frame and a plow gang including a plurality of beam members and a forward beam extension having pivotal connection with the wheeled draft frame forwardly of the rear axle thereof and constituting the draft connection of the plow gang to the wheeled draft frame, of a steadying bail having its side members pivotally connected with the rear portion of the tractor, and means movably connecting the cross member of the bail with the beam members of the plow gang rearwardly of said beam extension, said cross member of the bail having one end higher than the other, whereby said cross member may be horizontal when the wheeled draft frame is transversely inclined.

6. The combination with a wheeled draft frame, of a plow gang provided with a forward draft beam extension pivotally connected with the wheeled draft frame forwardly of the rear axle thereof, a bracket on one unit of said plow gang and having a horizontal elongated slot, a bail pivoted to the rear end portion of the wheeled draft frame and having its cross bar extending across the units of the plow gang and through the elongated slot of said bracket, a lever pivoted to another unit of said plow gang and having a depending arm, a link connecting said depending lever arm with the cross bar of the bail, and means for locking said lever.

In testimony whereof I have signed this specification in the presence of two subscribing witnesses.

WILLIAM L. PAUL.

Witnesses:
 EDWIN NICAR,
 CHARLES A. WEBSTER.